(12) United States Patent
Kuo et al.

(10) Patent No.: US 6,338,811 B2
(45) Date of Patent: Jan. 15, 2002

(54) SURFACE PLANARIZATION OF MAGNETIC DISK MEDIA

(75) Inventors: David Shiao-Min Kuo, Castro Valley; Samuel John Falcone, San Jose, both of CA (US)

(73) Assignee: Seagate Technology, Scotts Valley, CA (US)

( * ) Notice: Subject to any disclaimer, the term of this patent is extended or adjusted under 35 U.S.C. 154(b) by 0 days.

(21) Appl. No.: 09/874,544

(22) Filed: Jun. 4, 2001

Related U.S. Application Data

(62) Division of application No. 09/273,199, filed on Mar. 19, 1999.
(60) Provisional application No. 60/078,546, filed on Mar. 19, 1998, and provisional application No. 60/078,617, filed on Mar. 19, 1998.

(51) Int. Cl.$^7$ ................................................ B29C 59/00
(52) U.S. Cl. ........................ 264/129; 427/128; 427/131
(58) Field of Search ................................. 427/128, 131; 264/129

Primary Examiner—Bernard Pianalto
(74) Attorney, Agent, or Firm—Mitchell S. Feller; Clifford Chance Rogers & Wells LLP

(57) ABSTRACT

A method for producing a substantially smooth surface on a computer disk media comprises providing a substantially smooth master surface. A curable polymer dielectric composition is applied to the master surface as well as the surface of the disk to be smoothed. The master surface is then pressed onto the disk surface and the polymer is cured. The master surface is then removed and the cured polymer forms a smooth surface on the disk.

8 Claims, 3 Drawing Sheets

SURFACE PLANARIZATION OF MAGNETIC DISK MEDIA

This is a Division of Ser. No. 09273199 filed Mar. 19, 1999. This application claims priority from U.S. Provisional Application Nos. 60/078,546 and 60/078,617, both filed on Mar. 19, 1998.

BACKGROUND OF THE INVENTION

The present invention relates to the field of magnetic disk media More specifically, the present invention relates to rigid disk media used in high-speed magnetic disk drive storage systems.

Magnetic disk drive storage systems are typically used in computer systems. Digital information is stored on magnetic disk media in concentric memory tracks. The storage takes place in the form of magnetic transitions within a disk media. In a hard disk drive the disk media is a platter rotatably mounted on a spindle which supports the platter. The rotation of the disk platter creates a thin cushion of air, or other gas such as helium, over the surface of the disk platter.

Typically, an actuator is provided proximate to the disk platter to support a transducer incorporated into read/write heads. The read/write heads transfer data to and from concentric tracks formatted into the surface of the media. The tracks are electronically divided into sectors allowing information to be stored and retrieved from a specific track and sector on the disk media. The thin cushion of air lifts the heads over the surface of the disk. Using the cushion of air as a low friction gas bearing, the heads "fly" over the disk media. The actuator positions the transducer head over a track as the media rotates. The head remains stationary over the selected track until the proper sector is positioned under the transducer by the rotating media. Once properly aligned, the transducer head causes the desired transitions in the magnetic disk media. The heads are then repositioned for the next transition.

The ability to maximize the storage of data on the disk is partially a function of the ability to fly the heads close to the surface of the disk, such that the dispersion of the interaction for each data transition point is minimized. Minimal dispersion translates into a higher density of magnetic transitions in the magnetic recording media. In addition a lower flying height lessens the distortion of signals sent to and from the read/write heads.

Current trends to increase the power and speed of computers, while at the same time reduce the size of the computer, make it desirable to increase the areal density of storage on disk media and decrease the time required to write or retrieve information. Areal density may be increased by increasing the number of bits of information stored per inch of media (BPI) and/or increasing the number of tracks per inch of media (TPI). Generally, this requires lower flying heights for the heads. However, irregularities in the disk surface can cause disruptions in the gas bearing and head crashes as the heads fly closer to the surface.

Read/write access speed can also be improved by increasing the rotational speed of the disk media. Amongst other effects, the increased rotational speed decreases the time required to wait for a desired sector to rotate into position after the head is positioned over the desired track. However, computer hard disk media are susceptible to flutter when rotated at high speeds. Flutter can cause head crashes and track mis-registration, offsetting the benefit of the increased speed.

Disk flutter is induced by airflow over a disk. As a disk rotates it causes disturbances in the atmosphere surrounding the disk. These disturbances exert pressure on the disk platter and cause the disk to vibrate or flutter. In order to decrease disk flutter, the flow disturbance must decrease, or the response of the disk platter to the disturbance must decrease. A disk with higher modulus substrates can be less susceptible to flutter. In addition a disk sealed in a partial vacuum or a lighter gas, such as helium, can be less susceptible to flutter.

Conventional hard disk media use aluminum substrates. Aluminum substrates have a relatively low modulus and are therefore more susceptible to flow disturbance. Ceramics, laminates or other high modulus materials can also be used as a substrate for disk platters. However, high modulus materials such as ceramic are very hard and difficult to machine to the requisite smoothness. Machining can greatly add to the cost of the component. Laminates require additional steps to manufacture.

Control of vibrational disturbance can also be accomplished by decreasing the rotational speed of the disk drive. Flutter resulting from disk rotation speed is typically a squared function. However, disk drives are increasingly required to have higher rotational speeds in order to meet the demands for faster access times. Therefore, reducing the rotational speed to contain flutter is not effective.

It is also not effective to increase the thickness of a disk substrate to reduce flutter. Platters with thicker substrates put additional mechanical stress on the drive mechanisms. This unwarranted stress can result in bearing failure and drive motor problems, therefore it is also not effective.

Another approach includes laminating a vibrational damping layer between two rigid plates which can also be used to address vibrational problems. Two half-thick rigid aluminum platters can be laminated with a layer of viscoelastic adhesive in between. The energy absorbing property of the laminate greatly reduces the effect of flow disturbance and thereby minimizes flutter. However, the laminated platter process makes it inherently difficult to control substrate flatness. In addition if the vibrational damping layer is not in intimate contact with both rigid platters, trapped moisture may cause problems in subsequent processes wherein heat is applied.

Therefore, there is a need for an easily manufactured rigid magnetic media with super-smooth surface finish as well as excellent vibration performance to meet high rotational speed requirements.

SUMMARY

In general, a rigid disk drive media and method for improving surface smoothness and vibrational damping of a disk, such as a magnetic computer disk, are disclosed. According to one aspect a computer disk drive media includes a substrate with a planarized dielectric coating. The dielectric coating can be a viscous material coated on to a disk substrate to form a dielectric coating that fills in the gaps of the previously formed geometry. The coated surface can result in a profile with improved surface smoothness. Still further smoothing may be accomplished by polishing the surface of the dielectric coating. The coating process can be accomplished via spin coating, free flow coating, or dip coating. The appropriate form of coating will depend on the polymer formulation. The damping layer can provide improved vibrational control and increased smoothness as compared to the surface of the substrate.

Various implementations can include one or more of the following features. The disk drive media can include multiple dielectric coatings. In addition a magnetic ferrous coating can be applied over the dielectric coating. In some embodiments, the dielectric coating is applied to an upper and a lower surface of the substrate.

According to other aspects, the substrate can include aluminum, ceramic or other substances. In addition the dielectric coating can include a photopolymer. In another aspect the dielectric coating can be between 0.1 μm and 10 μm thick. In one embodiment the dielectric coating is polished with chemical mechanical polishing.

Implementations of the present invention can include a method for forming a computer disk drive platter with improved vibration control by applying a dielectric coating to a disk substrate. The vibrational damping material can be applied at a first grind stage, or other stage. In one embodiment, the dielectric material can be applied using a spin-on planarization technique including application of a polymer formulation to a surface of a substrate platter; spinning the substrate platter to form a uniform layer of the polymer formulation across the surface and curing the polymer formulation on the substrate.

According to another aspect, the method includes preheating the substrate. The method can also include curing being performed in a vacuum pumped chamber.

According to one embodiment the method disclosed can also include the step of baking the substrate platter with a layer of cured polymer formulation at a temperature of between 160° C. and 200° C. in addition to a nitrogen purge. In another embodiment, the method can include baking the substrate platter with cured polymer formulation at a temperature of between 170° C. and 190° C. under vacuum.

In still another embodiment this invention provides for a computer disk drive including a transducer supported by an actuator arm, the transducer can be located proximate to a media that is coated with a planarized magnetic means for providing viscous damping.

DETAILED DESCRIPTION

Figure 1:
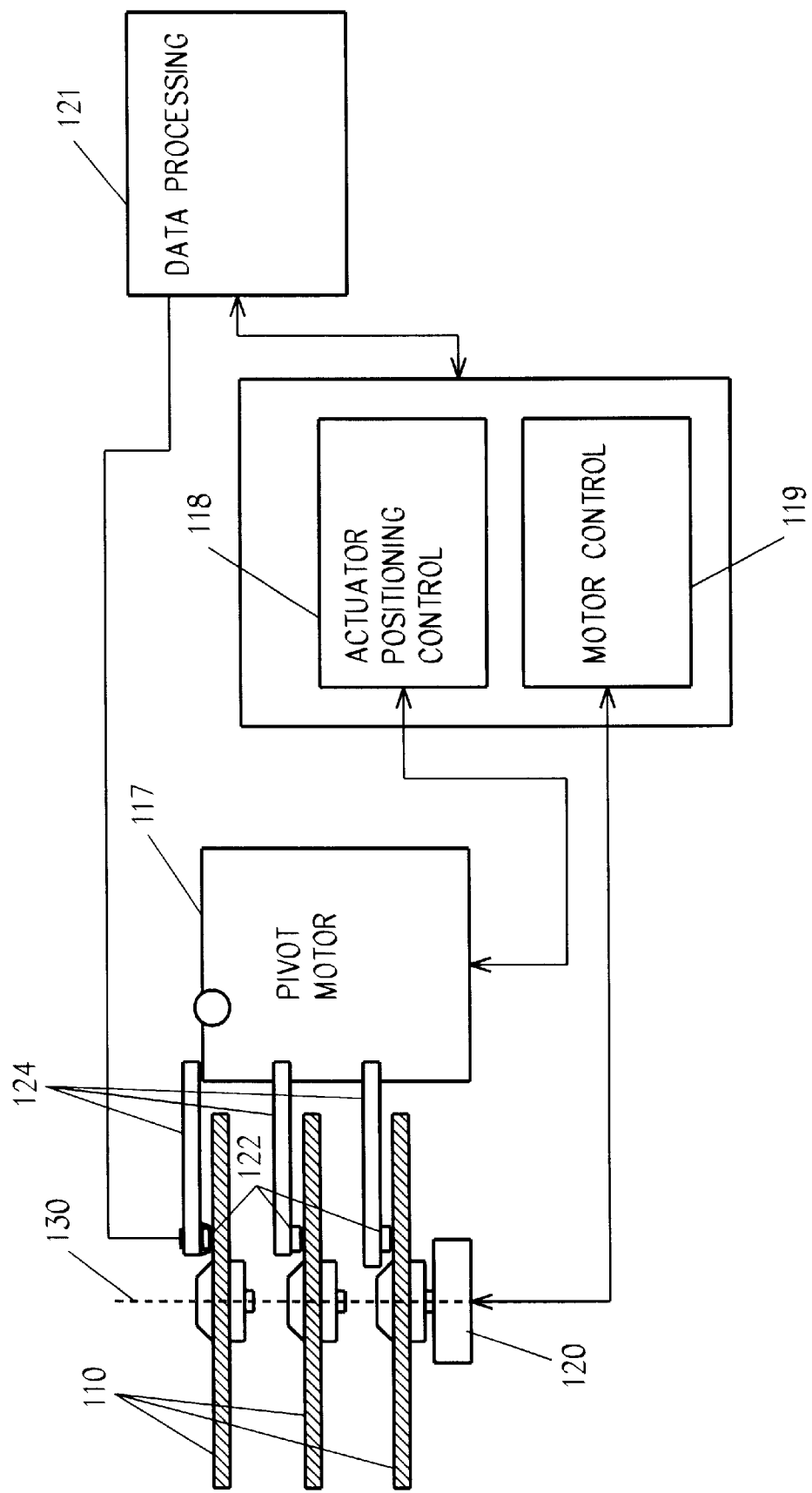
FIG. 1 is a simplified block diagram illustration of a disk drive.
Figure 2:
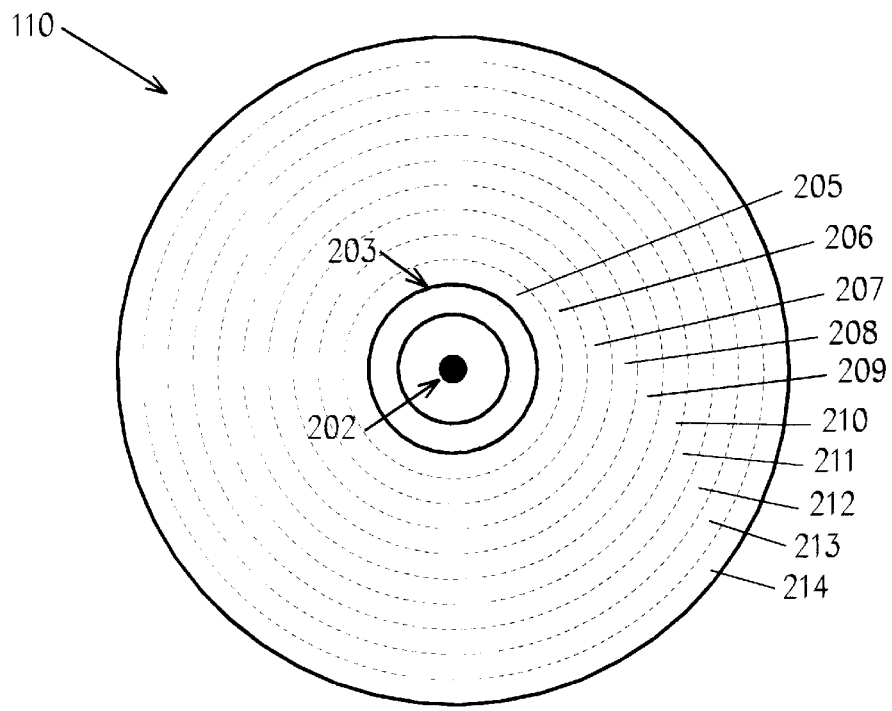
FIG. 2 is a top view of a disk drive platter.

Referring now to FIGS. 1 and 2, a disk drive includes a plurality of disk platters 110. The disk platters are centered on a common axis 130 and rotated by a motor 120. A motor control 119 can regulate the speed of rotation. A transducer 122 also referred to as a magnetic read/write head can be located proximate to the surface of the disk platter 110. The transducer 122 can be supported by an actuator arm 124. The transducer 122 is positioned by a pivot motor 117 attached to the actuator arm 124. The transducer 122 can magnetically read data from and write data to data tracks 205-214 formatted into the disk platter 110. The actuator arm 124 can be controlled by an actuator positioning control 118.

Referring now to FIG. 2, data tracks 205-214 can be formatted into the magnetic disk drive platter 110. Data tracks 205-214 can be formatted with the transducer 122 or other magnetic writing device. The data processing unit 121 can cause the transducer 122 to format tracks 205-214 with a preprogrammed density. In addition, a lubricated zone 203 can be formed towards the inner portion of the platter 110 and a spindle 202 can be fashioned into the center of the platter 110.

Figure 3:
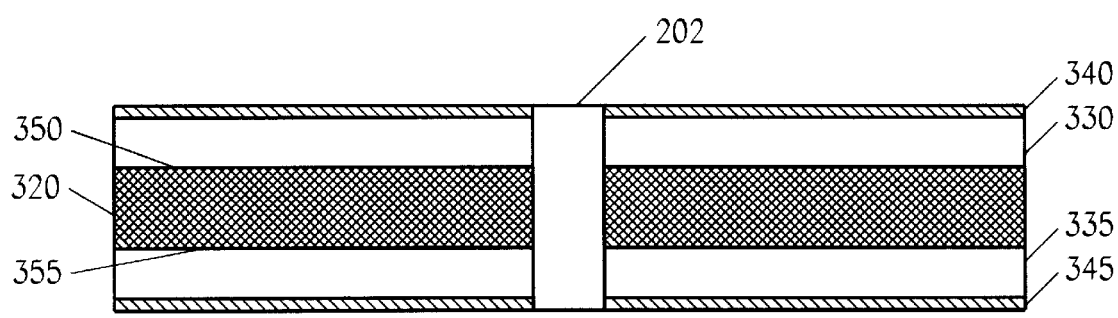
FIG. 3 illustrates an improved disk drive platter with a dielectric coating according to the invention.

Referring now to FIG. 3, the disk platter 110 includes a substrate 320. The substrate can include material such as aluminum, glass, glass-ceramics, Alumina, AlBC, other metal alloy, a laminate or other substance. In addition, a substrate can be coated to achieve other desirable characteristics. For example, an aluminum platter can be plated with nickel phosphorous (NiP/aluminum) to increase the strength of the platter. Typically, a substrate will be formed with inherent irregularities on an upper surface plane 350 and a lower surface plane 355. The irregularities can limit areal density of data storage by limiting the proximity of transducer 122 to the upper surface 350 or lower surface 355 during operation. In addition, the application of a dielectric coating 330 and 335 on the surface of the substrate 320 can absorb vibration, reduce disk flutter and smooth irregularities on the substrate surfaces 350 and 355.

Application of the dielectric material 330 and 335 can be accomplished at different stages of a process used for smoothing a disk platter substrate. For example, the dielectric layer 330 and 335 can be applied at a first lap grind, a second lap grind, a plating, a first polish, or a second polish stage. The thickness of a dielectric coating 330 or 335 can affect the planarization efficiency. In one embodiment, thickness of the layer 330 or 335 can be generally 0.1 μm to 10 μm, subject to optimization. The thickness of the layer applied can be controlled by the spinning speed during a spin-on process, as well as the viscosity of a coating solution.

The dielectric coating 330 and 350 can be applied using spin coating, free flow coating, dip coating or other coating process, depending upon a formulation chosen. The dielectric coating 330 and 350 can include silicon dioxide, polyimide formulations which are thermally cured, photopolymer formulations, urethane-acrylates or epoxy-acrylates IS which are cured through exposure to ultraviolet (UV), polyaryl ether formulations or other formulations that have excellent thermal and dimensional stability and in which the coating properties can be tuned for optimum substrate adhesion and damping characteristics.

Typically, a liquid silicon-based solution is applied to the substrate surface 350. Optionally a substrate 320 can be preheated to 170° C. to 190° C. in order to purge impurities from a platter prior to application of the silicon based solution. Following application of the solution, the substrate 320 and solution can then be spun to disperse the solution across the surface of the substrate 320. A typical speed of rotation for the spinning can be between 500 and 300 rotations per minute (R.P.M.). As the solution covers the surface 350 of the substrate 320 it also fills in voids and irregularities. After dispersal, the solution can be cured.

Curing can be accomplished, for example, with a thermal process or by using ultraviolet irradiation. In addition these coating can be post baked in a chamber at a temperature of approximately 170° C. to 190° C. Curing can take place under vacuum, in a vacuum pumped chamber. In addition a nitrogen purge can be used to remove unwanted volatile material from the chamber. A reducing atmosphere can be created by flowing hydrogen and an inert gas into the chamber. After curing, the surface can be further smoothed with a polishing technique such as chemical mechanical polishing.

The surface roughness of an untreated substrate can be approximately 3000 Å. After application of a planarized dielectric coating, the surface roughness can be 4 Å or lower.

In one embodiment, the dielectric coating will have excellent resistance to high temperature exposure and low outgasing characteristics. These characteristics will facilitate the disk platter remaining compatible with a subsequent sputtering process used in disk manufacture. Sputtering can typically expose the substrate to temperatures of room temperature to 350° C. for a duration of between 1 second to four minutes. Sputtering can be used for instance to apply a magnetic ferrous coating 340 over the dielectric material 330 to facilitate magnetic recording on the platter 110.

A planarization coating can be applied to one or both surfaces of a substrate utilized in the manufacture of a rigid magnetic disk. In addition one or multiple coating of a dielectric material can be applied to reduce surface roughness after coating.

Figure 4:
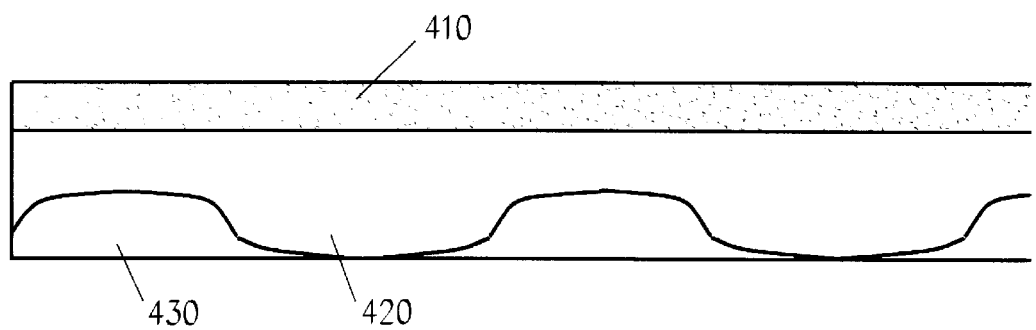
FIG. 4 illustrates polymer pressed between a master and blank plate.
Figure 5:
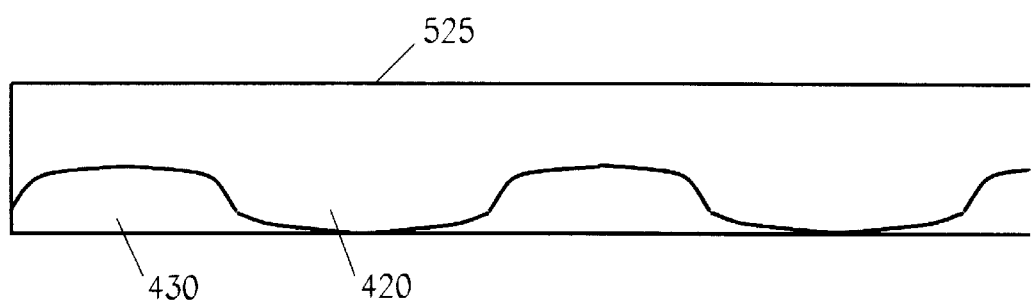
FIG. 5 illustrates a profile cutaway of a platter including a dielectric coating.

The method can be explained with references to FIGS. 4 and 5.

Example 1, below, illustrates a method to transform a very rough glass urface 430 having a surface roughness of 3000 Å, to a very smooth surface 525 (showing in FIG. 5) using the surface planarization technique.

EXAMPLE 1

In the surface planarization technique an adhesion promoter is applied to the rough surface 430 to allow the cured photopolymer 420 to adhere to surface 430 after cure.

The adhesion promoter may be a silane acylate. When the rough glass surface is treated with the adhesion promoter, silane bonds form between the rough glass surface and the adhesion promoter. The acrylate end of the adhesion promoter is then available to form covalent bonds with the photopolymer formulation. The cured photopolymer adheres very strongly to the adhesion promoted glass through the covalent bonds, but the photopolymer film does not adhere very strongly to the non-adhesion promoted smooth glass master.

An example of a suitable formulation for the adhesion promoter is a 0.16–0.18% solution of methacryloxypropyl-trimethoxysilane (MAPTMS) in a 95% solution of isopropanol 5% and 5% water.

IPA 1000 ml

Water 53 ml

MAPTMS 1.7 ml

Acetic Acid 0.5 ml

The above solution may be prepared and filtered using, for example, a 0.22 micron filter, and then used directly. In an implementation, the adhesion promoter is applied to a Ready to Polish (RTP) blank glass Ohara substrate of surface finish 3000 Å (e.g., surface 430 FIG. 4). The adhesion prooter may be applied using a spin coater such as "Ultratech™ Spin Coater" (manufactured by the Ultratech Company). After adding the adhesion promoter by spin coating, the disk is dryed at 110° C. for approximately 30 minutes.

The liquid photopolymer formulation (2P) may be prepared according to the directions below. In this example, a specific photopolymer formulation is listed, but it should be understood that many commercially available acrylate compounds which could be substituted in this formulation to provide a good photopolymer formulation for the surface planarization technique described here. An implementation of the formulation is:

| | |
|---|---|
| 2-Dimethoxy-2-phenyl acetophenone (DMPA) | 12 grams |
| Sartomer 349 epoxyacrylate resin | 180 grams |
| Trimethylolpropane triacrylate (TMPTA) | 52.5 grams |
| N-vinylpyrrolidone (NVP) | 52.5 grams |

The reactants listed above are mixed together and stirred until a complete solution is obtained.

Surface Planarization:

The adhesion promoted Ready to Polish (RTP) glass surface blank (e.g., surface 430 of FIG. 4). RA-3000Å, and the very smooth surface to be replicated or the master (e.g., surface 410 of FIG. 4) which is an Ohara TS10-4CSP substrate, Ra=4 Å are both coated with the liquid photopolymer formulation set forth above (2P), (FIG. 4, 420).

The two surfaces 430 and 410 are gently pressed together and exposed to UV light which cures the photopolymer formulation to a hard solid. The surfaces are separated and, as shown in FIG. 5, the cured photopolymer has adhered to surface 430 to surface planarize surface 430 to form the very smooth surface 525. Surface 525 has an Ra of 4 Å matching that of the master surface 410 of FIG. 4.

The above illustrates an example of a suitable procedure for carrying out this invention, but it is not meant to limit this invention.

A number of embodiments of the present invention have been described. Nevertheless, it will be understood that various modifications may be made without departing from the spirit and scope of the invention. For example, many excellent dielectric coatings are commercially available and will also work well according to this disclosure. In addition, dielectric coatings may be applied using spin coating, free flow coating or dip coating processes, depending on a formulation chosen. Accordingly, other embodiments are within the scope of the following claims.

What is claimed is:

1. A method for producing a substantially smooth surface on a computer disk media comprising the steps of:

providing a master surface having a substantially smooth surface;

applying a curable polymer dielectric composition to the disk surface and to the master surface;

pressing the master surface onto the disk surface;

curing the polymer; removing the master surface, wherein a surface of the cured polymer forms on the disk has a smoothness substantially equal to the master surface; and applying a magnetic ferrous coating to the cured polymer surface.

2. The method of claim 1, further comprising the step of applying an adhesion promoter to the disk surface prior to applying the curable polymer.

3. The method of claim 2, wherein:

the disk surface and the master surface are glass; and the adhesion promoter comprises silane acylate.

4. The method of claim 3, wherein the adhesion promoter comprises about 0.16% to 0.18% of methacryloxypropyltrimethoxysilane (MAPTMS) in a solution of about 95% isopropanol and 5% water.

5. The method of claim 3, further comprising the step of drying the adhesion promoter at substantially 110° C. for approximately 30 minutes.

6. The method of claim 1, wherein:

the polymer is a photopolymer;

the master surface is formed on a substrate transparent to UV light; and the step of curing comprises exposing the substrate to UV light directed at the master surface to cure the photopolymer.

7. The method of claim 6, wherein the photopolymer comprises by weight:

about 4% 2-dimethoxy-2-phenyl acetophenone;

about 61% sartomer 349 epoxyacrylate resin;

about 17.5% Trimethylolpropane triacrylate; and about 17.5% V-vinylpyrrolidone.

8. The method of claim 1, wherein the master surface has a smoothness Ra of about equal to 4 angstroms.

* * * * *